United States Patent

Willkens et al.

[11] Patent Number: 5,801,361
[45] Date of Patent: Sep. 1, 1998

[54] CERAMIC IGNITER WITH HOT ZONE THICKNESS OF 0.019 INCHES OR LESS

[75] Inventors: Craig A. Willkens, Worcester; Linda S. Bateman, Spencer, both of Mass.

[73] Assignee: Saint-Gobain/Norton Industrial Ceramics Corporation, Worcester, Mass.

[21] Appl. No.: 816,949

[22] Filed: Feb. 20, 1997

Related U.S. Application Data

[63] Continuation of Ser. No. 592,157, Jan. 26, 1996, abandoned.

[51] Int. Cl.⁶ .................... H05B 3/00; H01B 1/18
[52] U.S. Cl. .................... 219/270; 219/553; 501/97; 501/92; 501/89; 338/315; 338/306; 361/264
[58] Field of Search .................... 219/553, 270, 219/552, 505; 501/89, 92, 96, 97; 252/516; 338/315, 306; 361/264–266

[56] References Cited

U.S. PATENT DOCUMENTS

| | | | |
|---|---|---|---|
| 4,555,358 | 11/1985 | Matsushita et al. | 219/553 |
| 4,804,823 | 2/1989 | Okuda et al. | 219/553 |
| 5,045,237 | 9/1991 | Washburn | 252/516 |
| 5,085,804 | 2/1992 | Washburn | 252/516 |
| 5,191,508 | 3/1993 | Axelson et al. | 361/257 |
| 5,514,630 | 5/1996 | Willkens et al. | 501/89 |
| 5,564,618 | 10/1996 | Axelson | 228/124.1 |

*Primary Examiner*—John A. Jeffery
*Attorney, Agent, or Firm*—Thomas M. DiMauro

[57] ABSTRACT

A ceramic igniter comprises a pair of conductive ends, a hot zone disposed between the conductive ends, the hot zone having a density of at least about 95% of theoretical density and a composition comprising:

(a) between about 50 and about 80 vol % of an electrically insulating material selected from the group consisting of aluminum nitride, boron nitride, silicon nitride, and mixtures thereof.

(b) between about 10 and about 45 vol % of a semiconductive material selected from the group consisting of silicon carbide and boron carbide, and (c) between about 5 and about 25 vol % of a metallic conductor selected from the group consisting of molybdenum disilicide, tungsten disilicide, titanium nitride, and mixtures thereof, and a support upon which the hot zone is disposed, wherein at least a portion of the hot zone has a thickness of no more than 0.019".

20 Claims, 3 Drawing Sheets

CERAMIC IGNITER WITH HOT ZONE THICKNESS OF 0.019 INCHES OR LESS

This application is a continuation of application(s) Ser. No. 08/592,157 filed on Jan. 26, 1996 now abandoned.

BACKGROUND OF THE INVENTION

Ceramic materials have enjoyed great success as igniters in gas fired furnaces, stoves and clothes dryers. A ceramic igniter typically has a U-shape which contains conductive end portions and a highly resistive middle portion. When the igniter ends are connected to electrified leads, the highly resistive portion (or "hot zone") rises in temperature.

One conventional igniter, the Mini-Igniter™, available from the Norton Company of Milford, N.H., is designed for 8 volt though 48 volt applications, has a hot zone composition comprising aluminum nitride ("AlN"), molybdenum disilicide ("MoSi$_2$"), and silicon carbide ("SiC") and a hot zone cross-section of 0.060" by 0.030". As the attractiveness of the Mini-Igniter™ has grown, so has the number of applications requiring small igniters with rated voltages exceeding the conventional 24 volts. However, when used in such applications, the 24V Mini-Igniter™ is subject to temperature runaway and so requires a transformer in the control system to step down from conventional line voltage (i.e., 120 volts). Accordingly, there is a need for igniters rated for up to about 240V applications which do not require an expensive transformer but still possess the following requirements set by the appliance and heating industries to anticipate variations in line voltage:

| | |
|---|---|
| Time to design temperature | <5 sec |
| Minimum temperature at 85% of design voltage | 1100° C. |
| Design temperature at 100% of design voltage | 1350° C. |
| Maximum temperature at 110% of design voltage | 1500° C. |
| Hot-zone Length | <1.5" |
| Power (W) | 65–100. |

Because the amperage used for these high voltage applications will likely be comparable to that used in 24 volt applications (i.e., about 1.0 amp), the ability to function at increased voltage will likely be provided by increasing the resistance of the igniter.

Because the hot zone of the Mini-Igniter™ contains a highly resistive material (AlN), a moderately resistive material (SiC), and a highly conductive material (MoSi$_2$), one obvious avenue for increasing the hot zone's resistivity is to reduce its MoSi$_2$ and SiC contents while adding AlN. Towards this end, a trial composition containing about 76 volume percent ("v/o" or "vol %") AlN, 9 v/o MoSi$_2$, and 15 v/o SiC was green formed and hipped at a relatively high temperature (i.e., about 1815° C.). The resulting ceramic was found to be unsatisfactory in that it not only was slow to reach the design temperature, the higher hip temperature produced coarser grains which gave the composition a significant negative temperature coefficient of resistivity ("NTCR") which produces temperature runaway above about only 1350° C. A NTCR means that as the temperature of the igniter increases, its resistance decreases. This decrease makes the igniter hotter than it would be if the resistance was constant. If the NTCR is too extreme, the igniter is slow and cool at 85% and unstable at 110% of the rated voltage. Indeed, such an igniter may exhibit runaway at less than the 110% rating, in which case the amperage and temperature continue to rise even at a constant voltage until failure (burnout) occurs. Rather, it is preferable for the igniters to possess a positive temperature coefficient of resistance ("PTCR") or only a moderate NTCR. Whereas a ceramic having a PTCR increases in resistivity when its temperature is increased from 1000° C. to 1350° C., a ceramic having a moderate NTCR decreases in resistivity by less than 25% when its temperature is increased from 1000° C. to 1350° C. Either a PTCR or a moderate NTCR would allow for a more gradual temperature increase with increasing voltage, which is critical for high voltage applications because, as explained above, the igniter must operate stably over a broad range of voltage.

U.S. Pat. No. 5,085,804 ("the Washburn patent" or "Washburn") along with companion U.S. Pat. No. 5,045,237 disclose compositions suitable for the hot zone of a ceramic igniter comprising:

(a) between 5 and 50 v/o MoSi$_2$, and (b) between 50 and 95 v/o of a material selected from the group consisting of silicon carbide, silicon nitride, aluminum nitride, boron nitride, aluminum oxide, magnesium aluminate, silicon aluminum oxynitride, and mixtures thereof. Although the Washburn patent discloses a 220V igniter having a 0.06" by 0.024" hot zone cross-section made from 50 v/o AlN, 42.2 v/o SiC and 7.8 v/o MoSi$_2$, the low MoSi$_2$ level in the hot zone not only dramatically constrains the speed with which this igniter reaches its design temperature, it also produces a significant NTCR which renders the igniter unstable at 253 volts (110% of 230V rated voltage).

Therefore, there is a need for a material for a ceramic igniter possessing the high voltage performance requirements discussed above.

SUMMARY OF THE INVENTION

In accordance with the present invention, there is provided a ceramic igniter comprising:

(i) a pair of conductive ends, and (ii) a hot zone disposed between the cold ends, the hot zone comprising:

(a) between about 50 and about 80 vol % of an electrically insulating material selected from the group consisting of aluminum nitride, boron nitride, silicon nitride, and mixtures thereof, (b) between about 10 and about 45 vol % of a semiconductive material selected from the group consisting of silicon carbide and boron carbide, and mixtures thereof, and (c) between about 5 and about 25 vol % of a metallic conductor selected from the group consisting of molybdenum disilicide, tungsten disilicide, tungsten carbide, titanium nitride, and mixtures thereof, wherein at least a portion of the hot zone has a thickness of no more than 0.019". Preferably, the igniter further comprises a support upon which the hot zone is disposed, wherein the support has a thickness such that the combined thickness of the support and the hot zone disposed thereon is at least 0.020".

Also in accordance with the present invention, there is provided a method of heating comprising the steps of:

a) providing an igniter comprising:

(i) a pair of conductive ends, and (ii) a hot zone disposed between the conductive ends, the hot zone comprising:

(a) between about 50 and about 80 vol % of an electrically insulating material selected from the group consisting of aluminum nitride, boron nitride, silicon nitride, and mixtures thereof, (b) between about 10 and about 45 vol % of a semi-conductive material selected from the group consisting of silicon carbide and boron carbide, and mixtures thereof, and (c) between about 9 and about 14 vol % of a metallic conductor selected from the group consisting of molybdenum disilicide, tungsten disilicide, titanium nitride, and mixtures thereof, wherein at least a portion of the hot zone has a cross section of between 0.00015 and 0.00090 square inches, and b) applying a voltage of between 200V and 240 V between the conductive ends of the igniter, thereby causing the hot zone to heat to about 1350° C. in less than 5 seconds while avoiding a decrease in the resistivity of the hot zone of more than 25% as the temperature of the hot zone increases from 1000° C. to 1350° C.

DESCRIPTION OF THE INVENTION

It has been unexpectedly found that providing a support to the hot zone of a conventional Washburn igniter provides enough structural support for the hot zone to allow its thickness to be safely reduced, thereby producing electrical characteristics in the hot zone which meet the requirements for 220–240 V rated applications. Therefore, a narrow composition/cross section window has been discovered which provides the speed, resistance and structural integrity required for the high voltage igniters.

The product of the present invention is unexpected in light of Washburn. Whereas Washburn taught the practical lower limit of the hot zone thickness to be 0.020 inches, the product of the present invention has a thickness below that lower limit.

The method of use of the present invention is also unexpected in light of Washburn. Washburn taught that "(b)ecause electrical resistivity (of the Washburn compositions) can be varied over several orders of magnitude, configurations may be designed to accommodate the application rather than the electrical characteristics of the material . . . " (see col.7, lines 50–52 of the Washburn patent). Accordingly, Washburn taught that composition, not cross-section, should be varied in order to produce the electrical characteristics desirable in high voltage igniters. There is no suggestion that a relatively thin hot zone (i.e., a cross-section of between 0.00015 and 0.00090 square inches) in combination with a window of Washburn compositions achieves the desired high voltage characteristics. Indeed, Washburn teaches the desirability of relatively thicker shapes both by suggestion (see col.8, lines 3–6) and by example (see col. 7, lines 41, 59 and 64; col. 10, line 61; and col. 12, line 3). In contrast, the present invention has achieved the high voltage performance requirements chiefly by using hot zone cross-sections either near or below Washburn's practical lower limit. Moreover, since Washburn's compositional change for the 220 V igniter produces unsuitably slow speeds, there was no suggestion in the art that merely raising resistance (e.g., by providing a thin hot zone) would yield high voltage igniters with acceptable speeds. Other disclosures of ceramic igniters having thin hot zone cross-sections (e.g., U.S. Pat. No. 4,804,823) do not suggest their suitability in 200–240 V applications.

Figure 1:
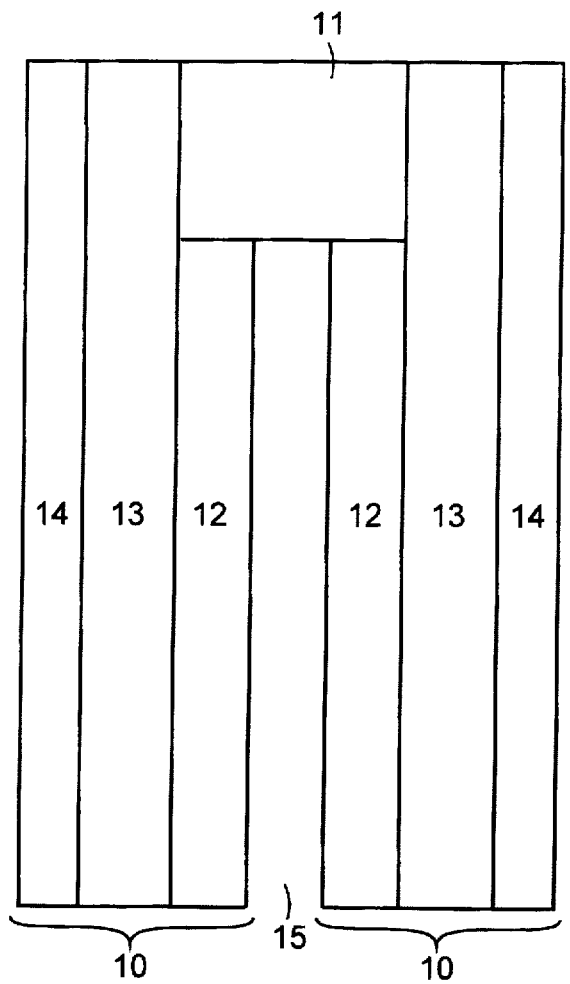
FIGS. 1 and 2 are front and perspective views, respectively, of preferred embodiments of the present invention.

As shown in FIG. 1, one preferred igniter of the present invention has a hairpin shape comprising two legs 10 placed in electrical connection by a bridge 11, wherein each of the two legs has an inner portion 12, a middle portion 13, and an outer portion 14, and extend from the bridge in the same direction, the middle portions 13 being in electrical connection with the bridge and comprising the hot zone composition, the inner and outer portions comprising supports.

Figure 2:
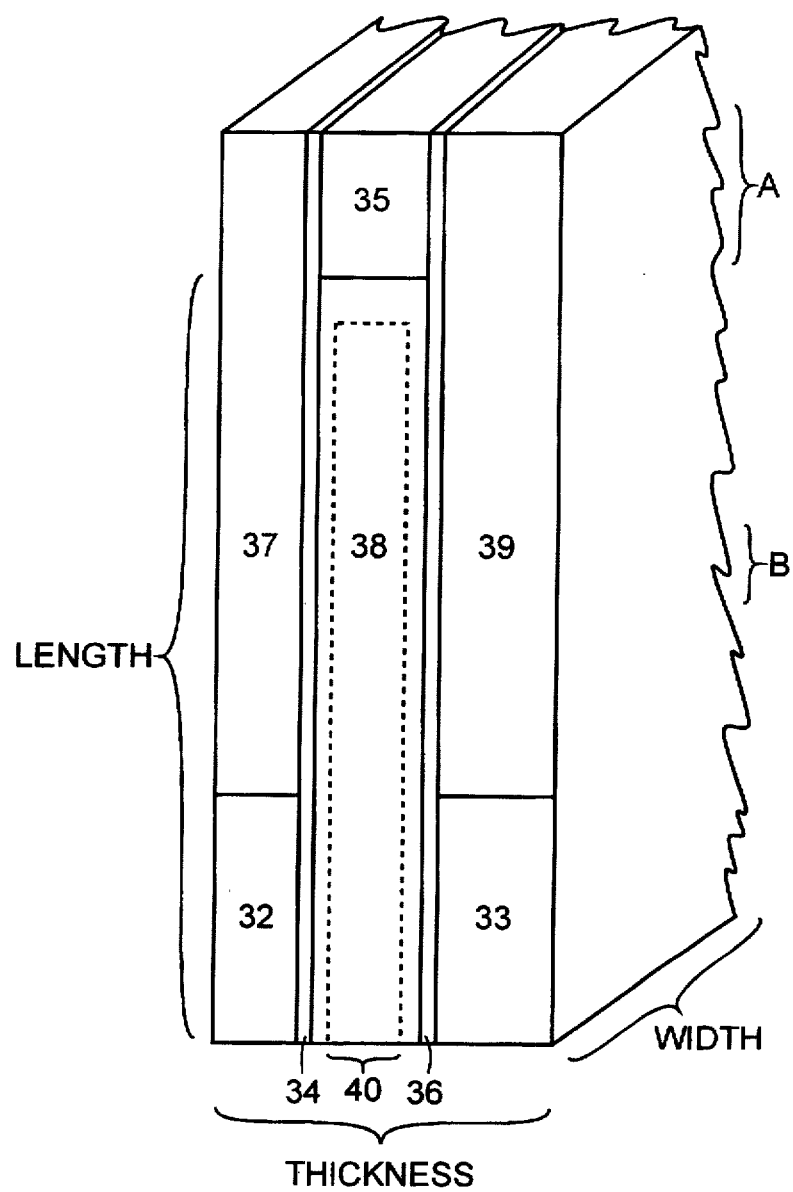

As shown in FIG. 2, one preferred igniter of this design has a pair of conductive ends 32 and 33 for attachment to electrical leads, hot zones 34, 35 and 36, and electrically insulative support sections 37, 38 and 39. When paired leads are attached to each of the conductive ends and a voltage is applied thereto, current travels from the first lead to the first conductive portion 32 through each of the hot zones 34–36 in succession (thereby causing the temperature of the hot zones to rise), and finally through the second conductive end 33 where it exits through the second lead.

The portions of the hot zone having the thin cross section (e.g., hot zones 34 and 36 of FIG. 2) have a thickness of between about 0.005" and 0.030", preferably between about 0.010" and 0.019". The width of these portions are generally between 0.020" and 0.050", preferably between 0.025" and 0.030", more preferably about 0.030". In one preferred embodiment employing a two-leg hairpin design, a hot zone is positioned within each leg and typically measures between about 0.5" and 1.2" in length (per leg), preferably between about 0.75" and 1.0" in length (per leg); and between about 0.020" and 0.050" in width, preferably about 0.030" in depth. For high voltage applications (i.e., between 200V and 240V, more typically between 220V and 240V), each of these hot zones typically has a cross section of between 0.00015 and 0.00090 square inches, preferably between 0.00030 and 0.00057 square inches, more preferably between 0.00045 and 0.00051 square inches.

Although each of portions 34, 35 and 36 shown in FIG. 2 are described as resistive, it should be clear that only one of these sections need be a resistive portion having the required cross section. For example, in some embodiments, portion 35 (also called a "bridge") can have a composition identical to conductive ends 32 and 33 which allows bridge 35 to serve as a flame sensor. In other embodiments, bridge 35 is a similarly resistive or more resistive material which helps control the temperature profile of the igniter.

Hot zones 34–36 provide the functional heating for gas ignition. In preferred embodiments, the component fractions of aluminum nitride, molybdenum disilicide and silicon carbide disclosed in U.S. Pat. No. 5,045,237, the specification of which is wholly incorporated by reference herein, are used. As indicated in the Washburn patent, the AlN-SiC-MoSi$_2$ system is a flexible one which can produce igniters having resistivities ranging from about 0.001 to about 100 ohm-cm. These hot zones generally have a resistivity of between 0.04 ohm-cm and 100 ohm-cm, and preferably between 0.2 ohm-cm and 100 ohm-cm in the temperature range of 1000° C. to 1500° C. In applications involving 200–240V voltages, the hot zone preferably comprises about 50 to 80 v/o aluminum nitride, and about 9–14 v/o MoSi$_2$, and 10–45 v/o SiC, and has a cross section of between 0.00015 and 0.00090 square inches. More preferably, it comprises about 60 to 70 v/o aluminum nitride, and about 10–12 v/o MoSi$_2$, and 20–25 v/o SiC, and has a cross section of between 0.00030 and 0.00057 square inches. Most preferably, it comprises about 64 v/o AlN, 11 v/o MoSi$_2$, and 25 v/o SiC, and has a cross section of between 0.00045 and 0.00051 square inches. When these hot zones were used in lower voltage applications, each performed acceptably. However, hot zones having a molybdenum disilicide content of 13–14 vol % and a cross section of 0.00021–0.00042 square inches) reached 1350° C. at only 100 V and so would burn out at 230 V; hot zones having a molybdenum disilicide content of 9 vol % and a cross section of 0.00060 square inches failed to reach 1000° C. at 230 V; and hot zones having a molybdenum disilicide content of 11–12 vol % and a cross section of 0.00045 to 0.00051 square inches) displayed good 230 V performance.

Preferably, the particle sizes of both the starting powders and the grains in the densified hot zone are similar to those described in the Washburn patent. In some embodiments, the average grain size ($d_{50}$) of the hot zone components in the densified body is as follows: a) electrically insulative material (i.e., AlN): between about 2 and 10 microns; b) semiconductive material (i.e., SiC): between about 1 and 10 microns; c) and metallic conductor (i.e., MoSi$_2$): between about 1 and 10 microns.

Conductive ends 32 and 33 allow for attachment of the wire leads. Preferably, they also are comprised of AlN, SiC and MoSi$_2$. However, they have a significantly higher percentage of the conductive and semiconductive materials (i.e., SiC and MoSi$_2$) than does the hot zone. Accordingly, they typically only have about 1/5 to 1/20 of the resistivity of the hot-zone composition and do not rise in temperature to the levels experienced by the hot zone. They preferably comprise about 20 to 65 v/o aluminum nitride, and about 20 to 70 v/o MoSi$_2$ and SiC in a volume ratio of from about 1:1 to about 1:3. More preferably, the conductive ends comprise about 60 v/o AlN, 20 v/o SiC and 20 v/o MoSi$_2$. In preferred embodiments, the dimensions of conductive ends 32 and 33 are 0.50"(single leg length)×0.030"(width)×0.030" (thickness).

The function of supports 37–39 is to provide mechanical support for the resistive portions 34–36. Supports 37 and 39 which support the thin hot zone portions typically have a length and width similar to hot zones portions 34 and 36 and a thickness of between 0.015" and 0.020", so that the combined thickness of the hot zone and its supporting supports is between 0.020" and 0.050". Preferably, the supports are made of an electrically insulating ceramic having a resistivity of at least 10$^6$ ohm-cm and a strength of at least about 150 MPa. Suitable ceramic compositions for the supports include compositions comprising at least 90 v/o of at least one of aluminum nitride, boron nitride, and silicon nitride. When supports are used, care must be taken to match the thermal expansion and densification rates of the supports and the adjoining hot zones. For example, it was found that providing a support consisting of 91 v/o aluminum nitride, 6 v/o yttria, 2 v/o alumina and 1 v/o silica with a conventional Washburn hot zone composition resulted in such diverse densification rates as to cause cracking. It was also found that when alumina was selected as the primary supporting material, it reacted with the glass media used in hot isostatically pressing the composition and caused thermal-expansion mismatch-induced cracking. In embodiments using an AlN-MoSi2-SiC system, it was found that supports comprising at least 90 vol % aluminum nitride and up to 10 vol % alumina possessed compatible thermal expansion and densification characteristics. Therefore, it is believed that supports comprising at least 90 v/o of at least one of aluminum nitride, boron nitride, and silicon nitride and 1–10 v/o of a densification aid selected from the group comprising alumina, yttria, magnesia, silica and calcia are suitable for use in the present invention. In preferred embodiments, the dimensions of the supports 37–39 are 1.00" (length)×0.030" (width)×0.030" (thickness).

It has also been found that the supports help to protect the hot zones from oxidation. In some embodiments, as in FIG. 1, the hot zones of each leg are supported by i) outer supports having substantially the same width and length as the adjoining hot zone, and ii) inner supports extending to the bridge and having a substantially the same width as the adjoining hot zone, thereby providing an oxidation resistant barrier for at least about 60% of the surface area of the hot zones contained within the legs. It has been found that oxidation resistant igniters such as these experience an amperage increase of less than 1% over 30,000 cycles. In contrast, conventional igniters having the same composition but no supports have been found to experience an amperage increase of about 15% over 30,000 cycles.

When leads are set upon the conductive ends of a preferred igniter of the present invention and a voltage of between 220V and 240V is applied across the leads, the highly resistive portion heats up to about 1350° C. in no more than about 5 seconds and produces a white-hot glow in the upper regions of the igniter, as designated by region A in FIG. 2. However, it was observed that in some embodiments, the glow tended to creep downwards to the region designated by region B. It was believed that the reason for this creep was that at temperatures above about 1100° C., enough current flowed directly across aluminum nitride-based support 38 to short the designed electrical path. It is not known whether the aluminum nitride powder (an electrical insulator having a resistivity of about 10E+6 ohm-cm at room temperature) carried an unusually high level of metallic contamination or if the glass hipping process introduced impurities into the aluminum nitride-based support. Whatever the cause for this phenomenon, it was found that providing a slot 40 of about 0.020" to 0.050" in thickness in support 38, as shown by the dotted lines in FIG. 2, successfully prevented that layer from being an effective short upon the igniter of the present invention. As shown in FIG. 1, in some embodiments, the slot 15 extends up to bridge 11.

Figure 3:
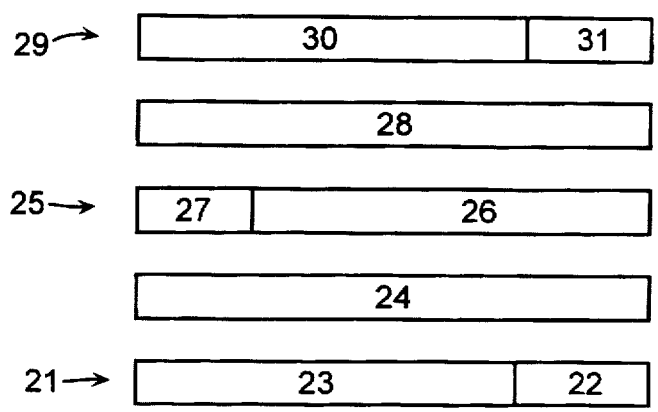
FIG. 3 is an exploded view of a preferred embodiment of the present invention.

Also in accordance with the present invention, there is provided a preferred method of making the present invention, wherein tiles having predetermined compositions are arranged so that the tile cross-section depicts an electrical circuit. In one preferred process for making the invention (and as shown in FIG. 3), a first tile 21 having a conductive portion 22 and an insulative portion 23 is laid on a flat surface (not shown) and a second tile 24 having only a resistive portion is laid atop the first tile. A third tile 25 having an insulative portion 26 and a resistive portion 27 is then laid atop the second tile 24 so that resistive section 27 lies above insulative section 23. Next, fourth tile 28 having only a resistive portion is laid atop the third tile 25. Lastly, a fifth tile 29 having an insulative portion 30 and a conductive portion 31 is laid atop the fourth tile so that the insulative portion 30 lies above resistive portion 27. This laminate is then densified so that the disparate tiles join. The densified laminate is then sliced across its depth to form a plurality of individual ceramic igniters.

In making the present invention, each green tile shown in FIG. 3 comprises an entire layer of the ceramic laminate (e.g., tile 25 has an insulative portion 26 and a resistive portion 27). Alternatively, the tiles may consist of only one portion of a layer. In the latter case, it has been found that tiles comprising a portion of a layer may be glued together without any attendant loss in properties.

Although FIG. 3 presents the highly resistive portions 24 and 28 as rigid green tiles, these portions alternatively can be made by either tape casting, roll compaction, warm pressing followed by slicing, or screen printing.

The processing of the ceramic component (i.e., green body processing and sintering conditions) and the preparation of the igniter from the densified ceramic can be done by any conventional method. Typically, such methods are carried out in substantial accordance with the Washburn patent. In preferred embodiments, the green laminates are densified by hot isostatic pressing in a glass media as disclosed in the Washburn patent. The densification yields a ceramic body whose hot zone has a density of at least 95%, preferably at least about 99% of theoretical density.

The igniters of the present invention may be used in many applications, including gas phase fuel ignition applications such as furnaces and cooking appliances, baseboard heaters, boilers and stove tops.

The practice of the present invention can be further appreciated from the following non-limiting Examples and Comparative Examples. For the purposes of the present invention, a "stable" igniter is one which maintains a constant resistivity and a constant temperature at a given voltage.

COMPARATIVE EXAMPLE I

This comparative example describes the 230 V behavior of an igniter in which the hot zone has a conventional Washburn composition and a conventional (i.e., too thick) cross-section.

A hot zone composition comprising about 66–71 v/o AlN, 8.5–9 v/o MoSi$_2$ and 20.5–25 v/o SiC was blended in a high shear mixer. A cold-zone composition comprising about 20 parts by volume AlN, about 20 parts by volume MoSi$_2$, and about 60 parts by volume SiC was similarly blended. These powder blends were then loaded into adjoining volumes of a hot press and hot pressed to form a billet of about 60% of theoretical density. This billet was then green machined in order to form two-zone tiles that were approximately 3.00"× 2.00"×0.20". Next, the machined tiles were subjected to hot isostatic pressing in which the tiles were soaked at 1790° degrees C. and 30,000 psi for 1 hour. After hipping, the dense tile was diamond machined to a hairpin design igniter (i.e., 1.5" single leg length ×0.030" thickness ×0.050" leg width with a 0.060" slot width) having a hot zone cross section of about 0.050"×0.030" and a hot zone length of about 1.0" per leg.

Figure 4:
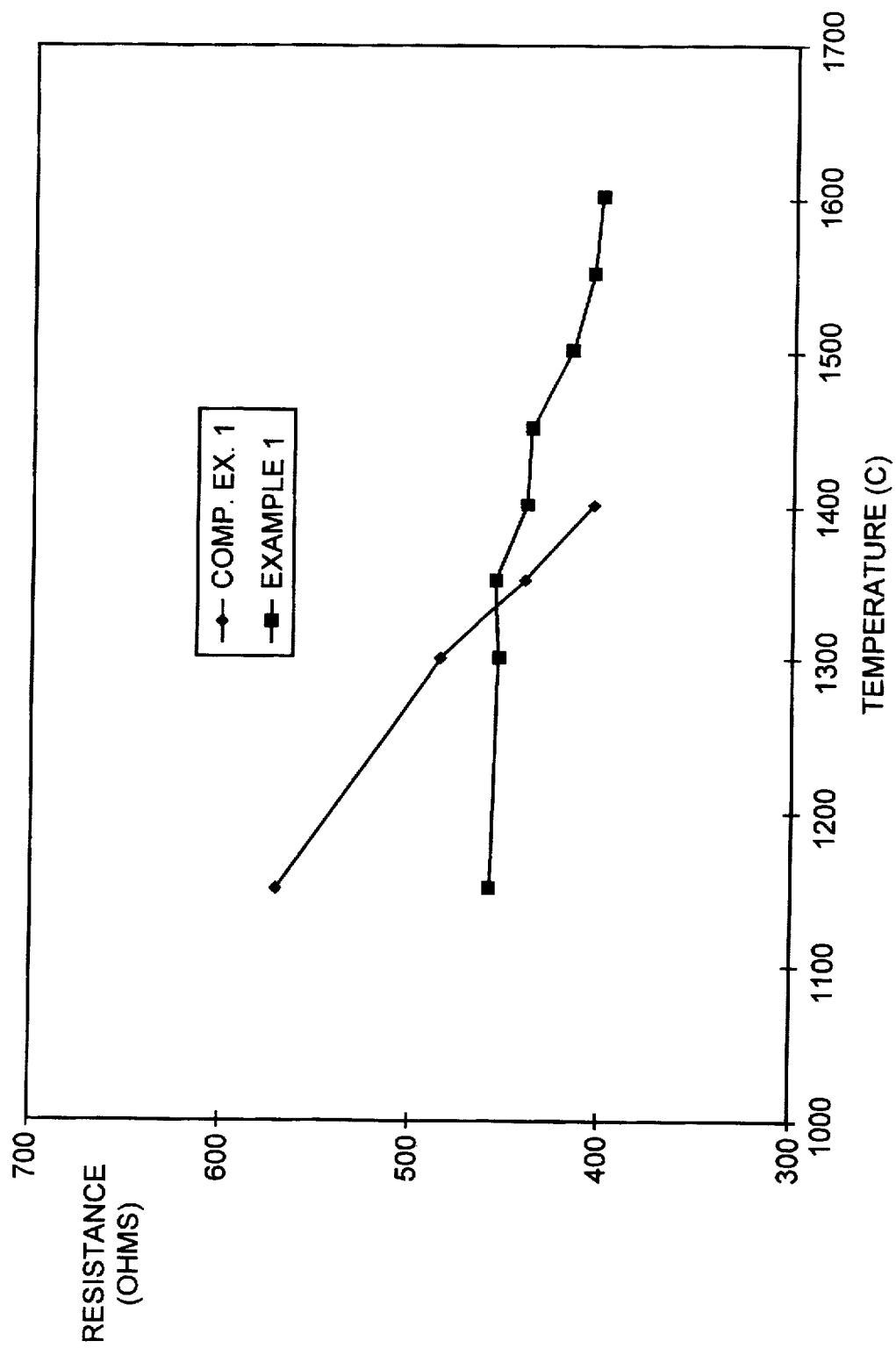
FIG. 4 displays the electrical performance of Comparative Example I and Example I in terms of resistance and temperature.

At 230 volts, the electrical performance of the resulting igniter is shown in FIG. 4 through resistance and temperature. At about 230 V, the temperature of the igniter continued to increase (i.e., runaway), causing the igniter to burnout.

EXAMPLE I

A green laminate was constructed in substantial accordance with the design shown in FIG. 2. Hot zones were made of 66 v/o AlN, 25 v/o SiC, and 11 v/o MoSi2. Support portions were made of 96 v/o aluminum nitride and 4 v/o alumina. Conductive ends were made of 20 v/o AlN, 60 v/o SiC, and 20 v/o MoSi2. The green laminate was then densified by glass hot isostatic pressing at about 1800° C. for about 1 hour to form a ceramic block. The block was then sliced across its width to produce a plurality of hot surface elements measuring 1.5"×0.050"×0.030". The hot zones had a cross section of about 0.015"×0.030" and a single leg length of about 1.0". A slot measuring 0.050"×0.030"×1.4" was machined into the middle insulative support portion.

Suitable leads were attached to the conductive portions of the hot surface element and a voltage of about 230 V was applied.

At 230 volts, the electrical performance of the resulting igniter is shown in FIG. 4 through resistance and temperature. The igniter displayed stable heating performance and reached the design temperature of 1100° C. in about 4 seconds.

EXAMPLE II

This example describes the 230 V behavior of an igniter in which the hot zone has too much molybdenum disilicide.

An igniter was made in substantial accordance with Example I, except that the hot zone had a molybdenum content of 15 v/o. The igniter reached operating temperature of about 1300° C. at only 24V. Although this performance is acceptable for a 24 V igniter, it was believed this igniter would likely burn out at 230V.

EXAMPLE III

This example describes the 230 V behavior of an igniter in which the hot zone has insufficient molybdenum disilicide.

An igniter was made in substantial accordance with Example I, except that the hot zone had a molybdenum content of only 6 v/o.

The igniter reached operating temperature after about 12 seconds, but displayed runaway behaviour at 240V.

EXAMPLE IV

This example describes the 230 V behavior of an igniter having no slot between the legs.

An igniter was made in substantial accordance with Example I, except that the middle aluminum nitride section was not slotted.

The igniter reached the design temperature quickly at 85% of the rated voltage (i.e., 5 seconds to 1100° C.). However, upon further voltage increase, it was observed that the hottest portion of the igniter moved downward toward the conductive regions, resulting in failure of the igniter.

We claim:

1. A ceramic igniter comprising:
   (i) a pair of conductive ends, and
   (ii) a hot zone disposed between the conductive ends, the hot zone comprising:
   (a) between about 50 and about 80 vol % of an electrically insulating material selected from the group consisting of aluminum nitride, boron nitride, silicon nitride, and mixtures thereof,
   (b) between about 10 and about 45 vol % of a semiconductive material selected from the group consisting of silicon carbide and boron carbide, and mixtures thereof, and
   (c) between about 5 and about 25 vol % of a metallic conductor selected from the group consisting of molybdenum disilicide, tungsten disilicide, tungsten carbide, titanium nitride, and mixtures thereof,
   wherein at least a portion of the hot zone has a thickness of no more than 0.019".

2. The igniter of claim 1 further comprising (iii) a support upon which the hot zone is disposed, wherein the support has a thickness such that the combined thickness of the support and the hot zone disposed thereon is at least 0.020".

3. The igniter of claim 2 wherein the support consists essentially of an electrically insulating ceramic selected from the group consisting of aluminum nitride, boron nitride, silicon nitride, and mixtures thereof.

4. The igniter of claim 3 wherein the support comprises at least 90 v/o of an electrically insulating ceramic selected from the group consisting of aluminum nitride, boron nitride, silicon nitride, and mixtures thereof and between 1 and 10 v/o of a densification aid selected from the group consisting of alumina, yttria, magnesia, calcia and silica.

5. The igniter of claim 1 wherein the hot zone composition comprises between 10 and 12 v/o molybdenum disilicide.

6. The igniter of claim 5 wherein the hot zone has a thickness of between 0.010" and 0.019".

7. The igniter of claim 1 wherein the igniter has a hairpin shape comprising two legs placed in electrical connection by a bridge, wherein each of the two legs comprise the hot zone composition, and the bridge comprises a conductive composition.

8. The igniter of claim 7 having a hairpin shape comprising two legs placed in electrical connection by a bridge, wherein the legs extend from the bridge in the same direction and each leg comprises an inner, middle, and outer portion, the middle portion being in electrical connection with the bridge and comprising the hot zone composition, the outer and inner portions comprising supports.

9. The igniter of claim 8 wherein the inner portion of each leg has a thickness such that the legs do not touch each other, thereby defining a slot between the legs.

10. The igniter of claim 9 wherein the slot extends to the bridge.

11. The igniter of claim 8 wherein the hot zones of each leg are supported by i) outer supports having substantially the same depth and length as the adjoining hot zone, and ii) inner supports extending to the bridge and having a substantially the same depth as the adjoining hot zone, thereby providing an oxidation resistant barrier for at least about 60% of the surface area of the hot zones contained within the legs.

12. The igniter of claim 8 wherein a single support between the legs defines the inner portions of each leg.

13. A method of heating comprising the steps of:
a) providing an igniter comprising:

(i) a pair of conductive ends, and (ii) a hot zone disposed between the conductive ends, the hot zone comprising:

(a) between about 50 and about 80 vol % of an electrically insulating material selected from the group consisting of aluminum nitride, boron nitride, silicon nitride, and mixtures thereof, (b) between about 10 and about 45 vol % of a semiconductive material selected from the group consisting of silicon carbide and boron carbide, and mixtures thereof, and (c) between about 9 and about 14 vol % of a metallic conductor selected from the group consisting of molybdenum disilicide, tungsten disilicide, tungsten carbide, titanium nitride, and mixtures thereof, wherein at least a portion of the hot zone has a cross section of between 0.00015 and 0.00090 square inches, and
b) applying a voltage of between 200V and 240 V between the conductive ends of the igniter, thereby causing the resistive portion to heat to about 1350° C. in less than 5 seconds while avoiding a decrease in the resistivity of the hot zone of more than 25% as the temperature of the hot zone increases from 1000° C. to 1350° C.

14. The method of claim 13 wherein the applied voltage is between 220 V and 240 V.

15. The method of claim 14 wherein at least a portion of the hot zone comprises between 10 and 12 vol % molybdenum disilicide and has a cross section of between 0.00045 and 0.00051 square inches.

16. The method of claim 14 wherein at least a portion of the hot zone comprises 60–70 vol % aluminum nitride, 20–25 vol % silicon carbide, 10–12 vol % molybdenum disilicide, and has a cross section of between 0.00030 and 0.00057 square inches.

17. The method of claim 13 wherein the igniter has a hairpin shape comprising two legs placed in electrical connection by a bridge, wherein each of the two legs comprise the hot zone composition, and the bridge comprises a conductive composition, wherein the legs extend from the bridge in the same direction and each leg comprises an inner, middle, and outer portion, the middle portion being in electrical connection with the bridge and comprising the hot zone composition, the outer and inner portions comprising supports, wherein the inner portion of each leg has a thickness such that the legs do not touch each other, thereby defining a slot between the legs.

18. The method of claim 13 further comprising a support upon which the hot zone is disposed, wherein the hot zone has a thickness of between 0.010" and 0.019", and the support has a thickness such that the combined thickness of the hot zone and the support is at least 0.020".

19. The method of claim 13 wherein at least a portion of the hot zone comprises 64 vol % aluminum nitride, 25 vol % silicon carbide, 11 vol % molybdenum disilicide, and has a cross section of between 0.00045 and 0.00051 square inches.

20. A ceramic igniter comprising a hot zone comprising:

(a) between about 50 and about 80 vol % of an electrically insulating material selected from the group consisting of aluminum nitride, boron nitride, silicon nitride, and mixtures thereof (b) between about 10 and about 45 vol % of a semiconductive material selected from the group consisting of silicon carbide and boron carbide, and (c) between about 5 and about 25 vol % of a metallic conductor selected from the group consisting of molybdenum disilicide, tungsten disilicide, titanium nitride, and mixtures thereof, the igniter having a hairpin shape comprising two legs placed in electrical connection by a bridge, wherein each of the two legs extend from the bridge in the same direction and each leg comprises an inner, middle, and outer portion extending longitudinally along the length of the legs, the middle portion being in electrical connection with the bridge and comprising the hot zone composition, the outer and inner portions comprising supports, wherein the outer supports have substantially the same depth and length as the adjoining hot zone, and the inner supports extend to the bridge and have substantially the same depth as the adjoining hot zone, thereby providing an oxidation resistant barrier for at least about 60% of the surface area of the hot zones contained within the legs.

* * * * *